(12) United States Patent
Hesse et al.

(10) Patent No.: US 11,480,148 B2
(45) Date of Patent: Oct. 25, 2022

(54) CONNECTION OF A ROTOR BLADE TO THE ROTOR HUB OF A WIND TURBINE

(71) Applicant: Wobben Properties GmbH, Aurich (DE)

(72) Inventors: Ingo Hesse, Ihlow (DE); Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/764,335

(22) PCT Filed: Nov. 7, 2018

(86) PCT No.: PCT/EP2018/080473
§ 371 (c)(1),
(2) Date: May 14, 2020

(87) PCT Pub. No.: WO2019/096653
PCT Pub. Date: May 23, 2019

(65) Prior Publication Data
US 2020/0370532 A1 Nov. 26, 2020

(30) Foreign Application Priority Data

Nov. 16, 2017 (DE) ...................... 10 2017 126 970.3
May 24, 2018 (DE) ...................... 10 2018 112 464.3

(51) Int. Cl.
*F03D 1/06* (2006.01)
*F03D 80/50* (2016.01)

(52) U.S. Cl.
CPC ......... *F03D 1/0658* (2013.01); *F03D 1/0675* (2013.01); *F03D 80/50* (2016.05);
(Continued)

(58) Field of Classification Search
CPC .......... F03D 3/064; F03D 3/06; F03D 1/0658; F03D 1/0675; F03D 1/0691;
(Continued)

(56) References Cited

U.S. PATENT DOCUMENTS 4,915,590 A * 4/1990 Eckland ................ F03D 1/0658
403/267
6,171,040 B1 1/2001 Sato
(Continued)

FOREIGN PATENT DOCUMENTS

| CN | 102410153 A | 4/2012 |
|---|---|---|
| CN | 205423056 U | 8/2016 |

(Continued)

OTHER PUBLICATIONS

"Reproduction of Thread M6x1 by Means of Threaded Inserts," DRIVE2 Magazine article, https://www.drive2.ru/l/456369894368215162/, Oct. 13, 2016, 12 pages.

Primary Examiner — Christopher Verdier
Assistant Examiner — Maxime M Adjagbe
(74) Attorney, Agent, or Firm — Seed Intellectual Property Law Group LLP

(57) ABSTRACT

A rotor blade for a wind turbine, to a rotor for a wind turbine, to a wind turbine, to a method for producing a rotor blade, to a method for connecting a rotor blade to a rotor hub and to a method for repairing a rotor of a wind turbine. The rotor blade has a connection interface, the connection interface having at least one cutout for receiving a tension element for connecting the rotor blade to a further element of a wind turbine, an outer circumferential surface of the cutout being formed of a connection material and having an internal thread.

15 Claims, 5 Drawing Sheets

(52) U.S. Cl.
CPC ....... *F05B 2230/60* (2013.01); *F05B 2230/80* (2013.01); *F05B 2240/21* (2013.01); *F05B 2240/30* (2013.01)

(58) Field of Classification Search
CPC .............. F05B 2230/60; F05B 2230/80; F05B 2240/21; F05B 2240/30
See application file for complete search history.

(56) References Cited

U.S. PATENT DOCUMENTS

| | | | |
|---|---|---|---|
| 6,371,730 | B1 | 4/2002 | Wobben |
| 7,481,624 | B2 | 1/2009 | Wobben |
| 7,722,328 | B2 | 5/2010 | Wobben |
| 8,025,485 | B2 | 9/2011 | Jacobsen |
| 8,142,157 | B2 | 3/2012 | Kita et al. |
| 8,172,531 | B2 * | 5/2012 | Wadehn ............ F16C 32/0644 416/27 |
| 8,192,170 | B2 | 6/2012 | Rohden |
| 9,605,651 | B2 * | 3/2017 | Busbey ................. F03D 13/10 |
| 9,810,197 | B2 | 11/2017 | Choi et al. |
| 10,077,757 | B2 | 9/2018 | Kannenberg et al. |
| 10,428,791 | B2 | 10/2019 | Spieth |
| 2007/0253819 | A1 * | 11/2007 | Doorenspleet ........ F03D 1/0658 416/134 A |
| 2012/0213638 | A1 * | 8/2012 | Frydendal .............. B29C 70/48 416/223 R |
| 2014/0178205 | A1 * | 6/2014 | Nanukuttan ........... B23P 11/00 416/241 R |
| 2014/0377069 | A1 | 12/2014 | Minadeo |
| 2014/0377078 | A1 * | 12/2014 | Bagepalli ............ F03D 1/0675 416/241 R |
| 2016/0334102 | A1 * | 11/2016 | Johnson ................. F23R 3/045 |
| 2017/0022969 | A1 * | 1/2017 | Hoffmann ............ F03D 1/0675 |
| 2017/0138342 | A1 | 5/2017 | Hoffmann |
| 2018/0372067 | A1 | 12/2018 | Hoffmann |
| 2019/0264650 | A1 | 8/2019 | Rubner et al. |

FOREIGN PATENT DOCUMENTS

| | | | |
|---|---|---|---|
| CN | 105952580 | A | 9/2016 |
| DE | 19733372 | C1 | 1/1999 |
| DE | 10201726 | B4 | 10/2004 |
| DE | 10324166 | B4 | 5/2005 |
| DE | 19962989 | B4 | 4/2006 |
| DE | 102011050966 | A1 | 1/2012 |
| DE | 102011088025 | A1 | 6/2013 |
| DE | 102014205195 | A1 | 9/2015 |
| DE | 102014206670 | A1 | 10/2015 |
| DE | 102014220249 | A1 | 4/2016 |
| DE | 102006022279 | B4 | 5/2016 |
| DE | 102014018280 | A1 | 6/2016 |
| DE | 102015007977 | A1 | 12/2016 |
| DE | 102015212906 | A1 | 1/2017 |
| DE | 102015120113 | A1 | 5/2017 |
| DE | 102016203269 | A1 | 8/2017 |
| DE | 102016110551 | A1 | 12/2017 |
| EP | 2372146 | A1 | 10/2011 |
| EP | 2623769 | A1 | 8/2013 |
| EP | 2679816 | A1 | 1/2014 |
| EP | 2806155 | B1 | 10/2016 |
| GB | 2509082 | A | 6/2014 |
| JP | 2000154817 | A | 6/2000 |
| JP | 2008180102 | A | 8/2008 |
| JP | 2009293622 | A | 12/2009 |
| JP | 2015-209630 | A | 11/2015 |
| RU | 2588311 | C2 | 2/2016 |
| WO | 2010/017820 | A2 | 2/2010 |
| WO | 2013/071936 | A1 | 5/2013 |
| WO | 2013/083451 | A1 | 6/2013 |
| WO | WO-2015155079 | A1 * | 10/2015 ........... F03D 1/0675 |

* cited by examiner

CONNECTION OF A ROTOR BLADE TO THE ROTOR HUB OF A WIND TURBINE

BACKGROUND

Technical Field

The invention relates to a rotor blade for a wind turbine, to a rotor for a wind turbine, to a wind turbine, to a method for producing a rotor blade, to a method for connecting a rotor blade to a rotor hub and to a method for repairing a rotor of a wind turbine.

Description of the Related Art

For the fastening of rotor blades to the rotor blade hub of wind turbines, or also for the fastening of rotor blade segments to one another, there are various solutions, as described, for example, in WO 2013/083451 A1, DE 197 33 372, DE 103 24 166, DE 199 62 989, DE 10 2006 022 279, DE 10 2011 088 025, DE 10 2014 206 670, DE 10 2015 120 113, DE 10 2016 110 551, DE 102 01 726, DE 10 2014 205 195 or DE 10 2014 220 249.

High requirements in terms of reliability are placed on the connections, while simple and inexpensive production and assembly are desired at the same time.

The German Patent and Trademark Office has searched the following further prior art in the priority application relating to the present application: DE 10 2015 212 906 A1, DE 10 2014 018 280 A1, DE 10 2011 050 966 A1, DE 10 2015 007 977 A1.

BRIEF SUMMARY

Provided is a rotor blade for a wind turbine, a rotor for a wind turbine, a wind turbine, a method for producing a rotor blade, a method for connecting a rotor blade to a rotor hub and a method for repairing a rotor of a wind turbine, which are improved in relation to existing solutions. In particular, provided is a rotor blade for a wind turbine, a rotor for a wind turbine, a wind turbine, a method for producing a rotor blade, a method for connecting a rotor blade to a rotor hub and a method for repairing a rotor of a wind turbine, which save costs and/or are simplified and/or particularly efficient and/or reliable.

The rotor blade for a wind turbine, has a connection interface, the connection interface having at least one cutout for receiving a tension element for connecting the rotor blade to a further element of a wind turbine, an outer circumferential surface of the cutout being formed of a rotor blade material and having an internal thread.

One or more embodiments of the invention is based, inter alia, on the knowledge that existing transverse bolt connections, for example, are indeed generally robust and reliable and easy to produce. However, currently, the additional weight which arises with these connections and the space required for the connection are often limiting factors. Embodiments are further based on the knowledge that existing rotor blade connections with threaded sleeves adhesively bonded in are also associated, in particular, with high costs, and can subsequently be replaced only with great difficulty.

By contrast, the solution described here makes an exceptionally light and space-saving connection possible since, as a result of the cutout being formed directly in the rotor blade material of the connection interface, no additional space and no additional material for threaded sleeves or the like is required. In this way, the number of cutouts and tension elements for a given rotor blade geometry, in particular a given connection geometry, can be significantly increased in relation to existing solutions. The solution described here further leads to cost savings, since production is faster and simpler and also fewer components (for instance no separate sleeves to be adhesively bonded in) are required.

The solution described here advantageously also makes it possible to repair the connection. The diameter of the cutouts can be enlarged as required, for example by drilling out and re-cutting the thread and/or introducing a threaded insert. In this way, a tension element (possibly with likewise correspondingly larger diameter or, in particular when using a threaded insert, also smaller or identical diameter) can again be introduced into the enlarged cutout.

The tension element is preferably introduced into the cutout with adhesive material. The adhesive material can be introduced into the cutout before and/or with and/or after the tension element. Preferably, a fill path, for example in the form of a bore, or a plurality of fill paths can be provided, in order to also be able to introduce the adhesive material into the cutout after the tension element has been introduced.

The connection interface preferably lies in a plane to which a rotor blade longitudinal axis is substantially orthogonal. The connection interface can preferably be of annular configuration and/or have an annular end surface.

In the present application, a rotor blade is in particular also understood to mean a rotor blade segment which can be connected to a further rotor blade segment to form a rotor blade. A rotor blade generally extends with the main extent direction thereof along a longitudinal axis from a rotor blade root to a rotor blade tip. A rotor blade comprising two assembled rotor blade segments can also be referred to as an assembled rotor blade.

The cutouts are used, in particular, for connecting the rotor blade to a further element of a wind turbine, such as, for example, a rotor blade hub and/or a rotor blade adapter and/or a (further) rotor blade segment. In an advantageous refinement, the further element of the wind turbine, such as, for example, a rotor blade hub and/or a rotor blade adapter and/or a (further) rotor blade segment, also likewise has a connection interface, the connection interface having at least one cutout for receiving a tension element for connecting the further element to the rotor blade, an outer circumferential surface of the cutout being formed of a connection material and having an internal thread.

This is particularly preferable for the connection of two rotor blade segments to one another.

Preferably, the respective cutouts of the rotor blade and of the further element of the wind turbine are arranged offset with respect to one another. In this way, tension elements can be received alternately in the rotor blade and in the further element. Further preferably, the rotor blade has a tension element anchor which is arranged in order to anchor a tension element, received in a cutout of the further element, in the rotor blade. Further preferably, the further element has a tension element anchor which is arranged in order to anchor a tension element, received in a cutout of the rotor blade, in the further element. The tension element anchor can comprise an opening and/or an anchoring element, for example a D-bolt.

In an exemplary embodiment, it is advantageously possible to form an assembled rotor blade which comprises a first rotor blade segment, which is configured in the form of a rotor blade as described here, and comprises a second rotor blade segment, which is configured in the form of a rotor blade as described here, a first tension element being received in the cutout of the first rotor blade segment and being anchored in the tension anchor of the second rotor blade segment, and a second tension element being received in the cutout of the second rotor blade segment and being anchored in the tension anchor of the first rotor blade segment. Preferably, the two rotor blade segments each have a connection interface with a plurality of cutouts which are preferably arranged alternately with a plurality of tension element anchors. The multiplicity of cutouts and/or the multiplicity of tension element anchors can be arranged in an annular manner, for example in the form of a ring or in the form of two or more rings, which are preferably arranged concentrically. Advantages of an assembled rotor blade are in particular a light and thin connection of two rotor blade segments, which makes it possible to arrange a multiplicity of tension elements in a confined space.

The cutout is preferably of substantially cylindrical configuration. Further preferably, the cutout has a substantially cylindrical shaft part with a first diameter and has a widened head part, which adjoins the opening, with a second diameter, the second diameter being larger than the first diameter. In the longitudinal direction of the cutout, the shaft part is preferably longer than the head part, in particular is many times longer than the head part.

A longitudinal axis of the cutout is preferably substantially parallel to a longitudinal axis of the rotor blade.

The tension element received in the cutout preferably has an external thread, the internal thread of the cutout and the external thread of the tension element preferably being configured to engage with one another.

The tension element received in the cutout can for example be received, with that end thereof which protrudes out of the cutout, in a transverse bolt of a further element of the wind turbine (such as a rotor hub, a rotor blade adapter or a (further) rotor blade segment) in order to fasten the rotor blade. Other fastening types are also possible.

According to a preferred embodiment, provision is made for the cutout to be configured in the form of a blind hole. The opening of the blind hole preferably lies in an end surface of the connection interface. A longitudinal extent of the cutout along the longitudinal axis is preferably longer than the length of that part of the tension element which is to be received therein.

It is further preferred for the cutout to be obtained by drilling and introducing an internal thread. In particular, it is preferred for the cutout to be obtained by drilling and, preferably subsequently, introducing an internal thread.

In a further preferred embodiment, provision is made for the cutout to have a depth which corresponds to at least a multiple of the diameter of the cutout. The depth preferably corresponds to an extent along the longitudinal axis of the cutout.

A further preferred further development is characterized in that the cutout has a depth which corresponds to at least three times, preferably at least six times the diameter of the cutout. The cutout preferably has a depth which corresponds to at most twelve times the diameter of the cutout.

It is further preferred for a diameter of the cutout to correspond to approximately a third, preferably about 10 to 50%, in particular 20 to 40%, of the extent of the connection interface orthogonal to the longitudinal axis.

A preferred development is characterized in that the rotor blade has a rotor blade material or is substantially composed of a rotor blade material. It is further preferred for the connection interface to have a connection material or to be substantially composed of a connection material. In a preferred embodiment, provision is made for the rotor blade material and the connection material to be identical. The connection material can be reinforced in relation to the rotor blade material.

The connection interface and/or other parts of the rotor blade can for example also comprise a reinforcement, which is likewise preferably entirely, or predominantly, composed of connection material and/or rotor blade material.

Preferably, the connection interface is manufactured integrally with the rotor blade and/or is configured in one piece with the rotor blade.

In this case, it is particularly preferred for the rotor blade material to be a fiber-reinforced composite material, in particular a fiber-plastic composite material, preferably a glass-fiber-reinforced epoxy resin composite material. It is further preferred for the connection material to be a fiber-reinforced composite material, in particular a fiber-plastic composite material, preferably a glass-fiber-reinforced epoxy resin composite material.

The fiber materials used can preferably be organic fibers, and/or inorganic fibers, and/or natural fibers.

Inorganic fibers are for example glass fibers, basalt fibers, boron fibers, ceramic fibers or steel fibers. Organic fibers are for example aramid fibers, carbon fibers, polyester fibers and polyethylene fibers (in particular high-performance polyethylene (HPPE) fibers, such as, for example, Dyneema fibers). Natural fibers are for example hemp fibers, flax fibers or sisal fibers.

Preferably, the matrix material of the fiber-reinforced composite material comprises, or is composed of, a plastic. The plastic preferably comprises, or is composed of, a thermoplastic and/or a thermoset. Particularly preferred are for example thermosetting plastics, such as polyester resin (UP) and/or epoxy resin, and/or thermoplastic plastics, such as polyamide. The matrix material of the fiber-reinforced composite material can comprise, or be composed of, cement and/or concrete and/or metal and/or ceramic and/or carbon.

In a further preferred embodiment, provision is made for the rotor blade material and/or the connection material to have a stiffness which is lower, in particular is many times lower, preferably is at least five times lower, for example is at least seven times lower, than the stiffness of a material of the tension element, with the elastic modulus and/or the shear modulus of the respective material, in particular, being used as a measure of the stiffness.

The tension element preferably comprises steel or is entirely, or predominantly, composed of steel.

A further preferred further development is characterized in that the connection interface has a multiplicity of cutouts. The multiplicity of cutouts can be arranged in one row or multiple rows. In this case, it is particularly preferable for the cutouts to lie on a circular path, or to lie on two, three or more substantially concentric circular paths. The cutouts can also lie on an elliptical path or on a plurality of elliptical paths. It is further preferred for the cutouts to be arranged equidistantly in the circumferential direction. Preferably, a number of tension elements which corresponds to the number of cutouts is provided, with a tension element preferably being arranged, or being able to be arranged, in each cutout.

According to a further aspect of the invention, provided is achieved by a rotor for a wind turbine, having a rotor hub and at least one rotor blade which is fastened to the rotor hub, the at least one rotor blade being configured as described above.

According to a preferred embodiment of the rotor, provision is made for the rotor hub to have a flange portion for connection of the rotor blade, and for the rotor blade to be screwed to the flange portion by means of a plurality of tension elements, which are received in a plurality of cutouts.

The flange portion is preferably configured in an encircling manner. It is further preferred for the flange portion to be of substantially T-shaped configuration in cross section.

In a further preferred embodiment of the rotor, provision is made for the tension element to be adhesively bonded in the cutout. In particular, it is preferable for the tension element to not only be screwed into the cutout but also adhesively bonded therein.

For this purpose, an adhesive material is introduced into the cutout before the tension element is introduced into the cutout. Inviscid adhesive materials and/or adhesive materials based on epoxide and/or polyurethane and/or methyl acrylate are preferably used as adhesive material.

According to a further aspect of the invention, provided is achieved by a wind turbine, comprising a tower and a nacelle which is arranged on the tower and which has a rotor, which rotor has a rotor hub and at least one rotor blade which is fastened to the rotor hub, the rotor blade being configured as above and/or the rotor being configured as above.

According to a further aspect of the invention, provided is achieved by a method for producing an above-described rotor blade, comprising providing a rotor blade having a connection interface, producing at least one cutout in the connection interface by drilling and, preferably subsequently, introducing an internal thread.

According to a further aspect of the invention, provided is achieved by a method for connecting a rotor blade to a rotor hub, comprising providing an above-described rotor blade, introducing an adhesive material into the cutout, fastening the rotor blade to the rotor hub by screwing a tension element into the cutout.

According to a further aspect of the invention, provided is achieved by a method for repairing an above-described rotor of a wind turbine, in particular repairing a connection of a rotor blade to a rotor hub, comprising releasing the tension element from the cutout, enlarging the cutout to a larger diameter, and introducing an internal thread, fastening the rotor blade to the rotor hub by screwing a tension element with a larger diameter into the cutout.

The introduction of an internal thread can be effected in such a way that an internal thread is introduced which has a smaller, a larger or an identical diameter in comparison with the pre-existing connection. In order to introduce an internal thread with larger or smaller or identical diameter, it is preferable to insert and/or adhesively bond a threaded insert into the enlarged cutout, with the threaded insert preferably being composed of metal or comprising metal. An internal thread which has a larger diameter in comparison with the pre-existing connection can also be formed directly in the rotor blade material of the connection interface, such that an outer circumferential surface of the cutout is formed of a rotor blade material.

In accordance with the diameter of the internal thread, a tension element which has a smaller, a larger or an identical diameter in comparison with the pre-existing connection is preferably screwed in.

The tension element can preferably be released from the cutout by applying a releasing torque until the adhesive bond fails, preferably by means of a so-called "screw extractor," and/or by performing a drilling-out operation.

The method for repairing an above-described rotor of a wind turbine is preferably carried out without the rotor blade being dismantled. This is particularly preferable if the bore of the mating piece is large enough and/or can be enlarged to the larger diameter. Repair and/or replacement of the tension elements in the assembled state has, inter alia, the advantage that it is possible to avoid dismantling the rotor blade, and it is thus possible to significantly reduce the time and cost outlay associated therewith.

Further advantageous embodiment variants of the apparatus according to the invention are produced by combining the preferred features discussed here.

With regard to the advantages, embodiment variants and embodiment details of said further aspects of the invention and the further developments thereof, reference is made to the preceding description in relation to the corresponding apparatus features.

BRIEF DESCRIPTION OF THE SEVERAL VIEWS OF THE DRAWINGS

Preferred embodiments of the invention will be described by way of example on the basis of the appended figures. In the figures.

DETAILED DESCRIPTION

Figure 1:
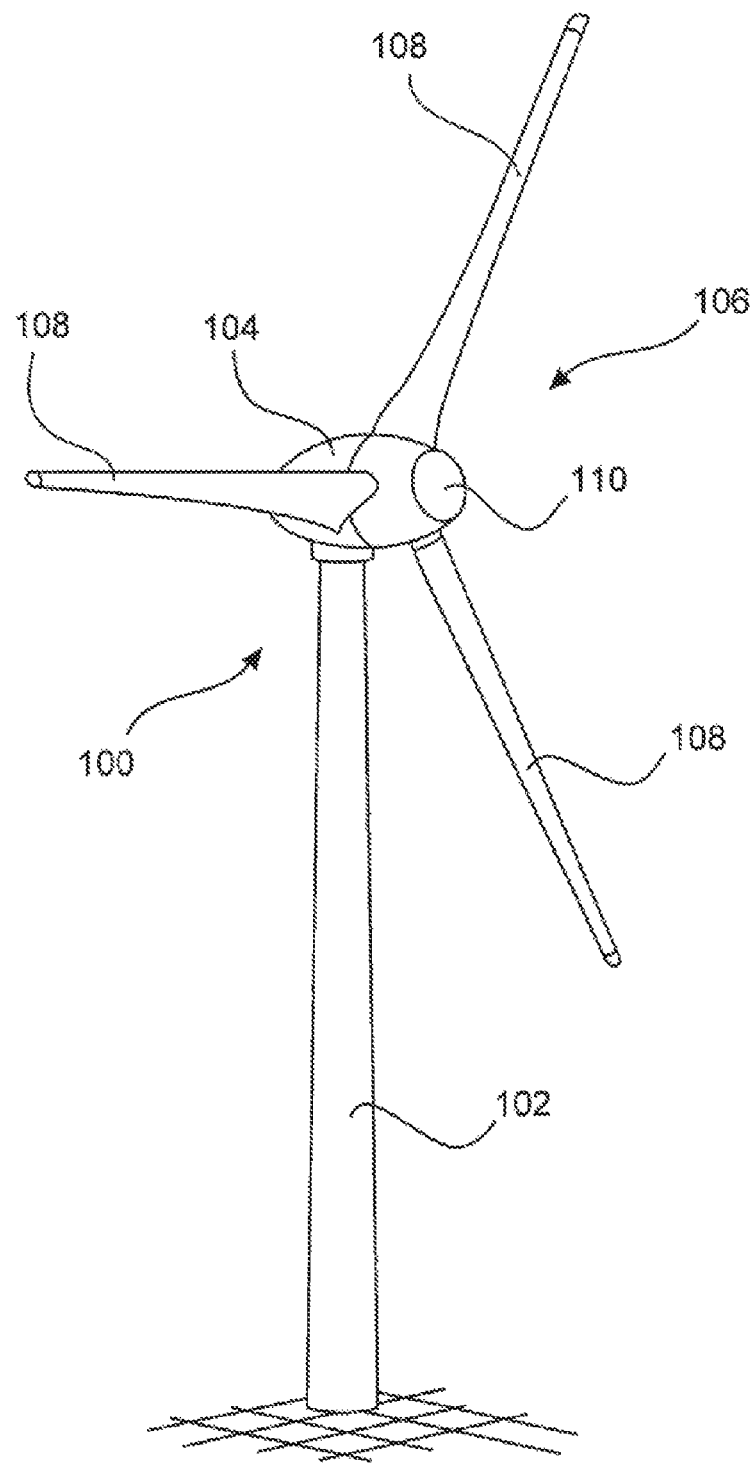
FIG. 1 shows a schematic illustration of a wind turbine having a rotor blade according to the invention.

FIG. 1 shows a schematic illustration of a wind turbine according to the invention. The wind turbine 100 has a tower 102 and a nacelle 104 on the tower 102. On the nacelle 104 there is provided an aerodynamic rotor 106 with three rotor blades 108 and a spinner 110. When the wind turbine is in operation, the aerodynamic rotor 106 is set in rotation by the wind and thus also turns an electrodynamic rotor of a generator, which is coupled directly or indirectly to the aerodynamic rotor 106. The electric generator is arranged in the nacelle 104 and generates electrical energy. The pitch angles of the rotor blades 108 can be changed by pitch motors of the respective rotor blades 108. The rotor blades 108 are fastened by means of the solution described here.

Figure 2:
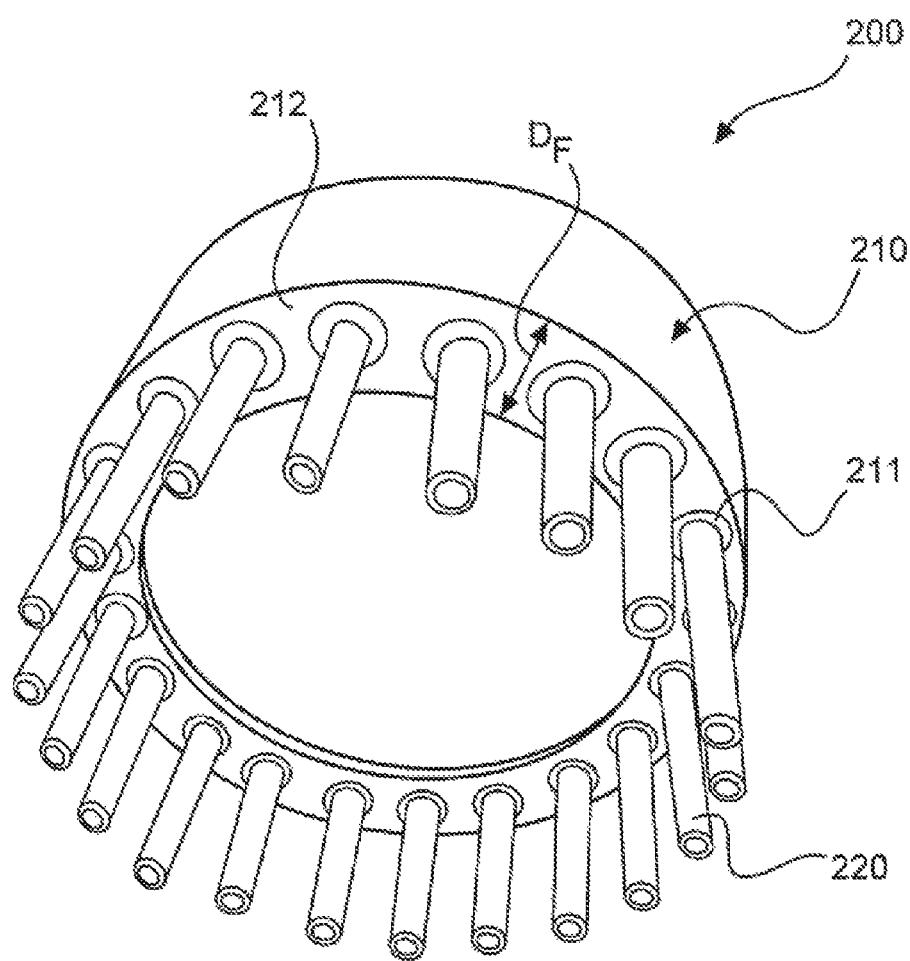
FIG. 2 shows a schematic illustration of a detail of an embodiment of a rotor blade having a connection interface with a plurality of cutouts, into which cutouts a respective tension element has been introduced.

FIG. 2 shows a schematic illustration of a detail of an embodiment of a rotor blade 200 having a connection interface 210 with a plurality of cutouts 211, into which cutouts a respective tension element 220 has been introduced. The outer circumferential surface of the respective cutouts 211 is formed by the connection material. The openings of the cutouts 211 lie in the end surface 212 of the connection interface 210. The diameter of the cutout 211 preferably corresponds to approximately a third, preferably about 10 to 50%, in particular about 20 to 40%, of the extent $D_F$ of the connection interface 210 orthogonal to a longitudinal axis of the cutout 211 and/or of the rotor blade 200.

Figure 3:
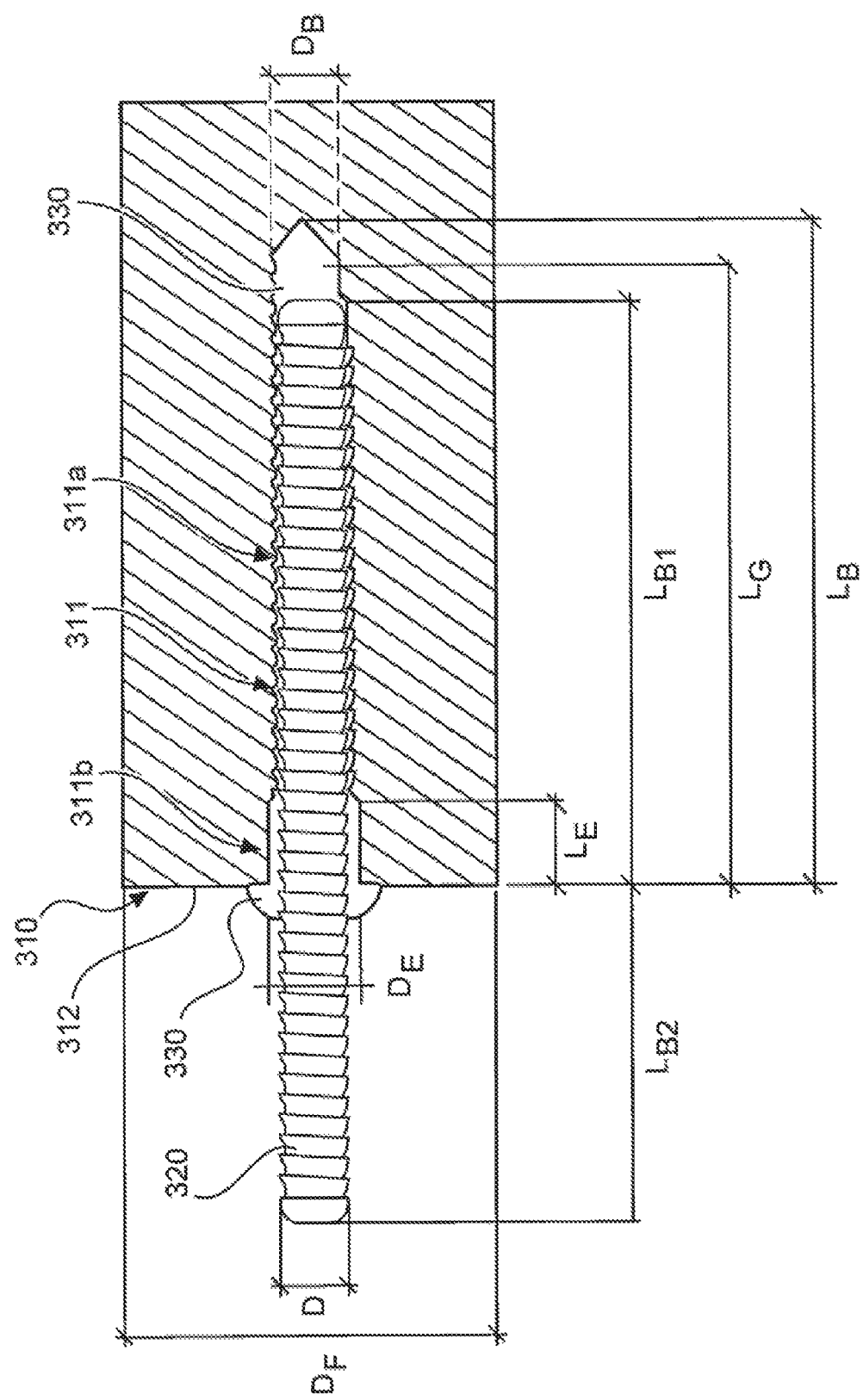
FIG. 3 shows a schematic longitudinal section through a cutout in a connection interface with tension element introduced.

FIG. 3 shows a schematic longitudinal section through a cutout 311 in a connection interface 310 with tension element 320 introduced, said tension element having a diameter D and a total length which consists of the length $L_{B1}$ of that part which is received in the cutout 311 and of the length $L_{B2}$ of that part which protrudes out of the cutout 311.

The outer circumferential surface of the cutout 311 is formed by the connection material. The cutout 311 is configured in the form of a blind hole, and the opening lies in the end surface 312 of the connection interface 310. Adhesive material 330 is introduced into the cutout.

The cutout 311 is of substantially cylindrical configuration and has a substantially cylindrical shaft part 311a with a first diameter $D_B$ and has a widened head part 311b, which adjoins the opening, with a second diameter $D_E$, the second diameter $D_E$ being larger than the first diameter $D_B$. In the longitudinal direction of the cutout, the shaft part 311a is many times longer than the head part 311b with a length $L_E$. Overall, the cutout 311 has a basic length $L_G$ and a total length $L_B$. Said longitudinal extent of the cutout 311 along the longitudinal axis is longer than the length $L_{B1}$ of that part of the tension element 320 which is to be received therein, and corresponds to a multiple of the diameter $D_B$ of the cutout 311. The diameter $D_B$ of the cutout 311 preferably corresponds to approximately a third, preferably about 10 to 50%, in particular about 20 to 40%, of the extent $D_F$ of the connection interface 310 orthogonal to a longitudinal axis of the cutout 311 and/or of the rotor blade.

Embodiments with multi-row connections can also be preferred.

The tension element 320 received in the cutout 311 has an external thread, the internal thread of the cutout 311 and the external thread of the tension element 320 being configured to engage with one another.

Figure 4:
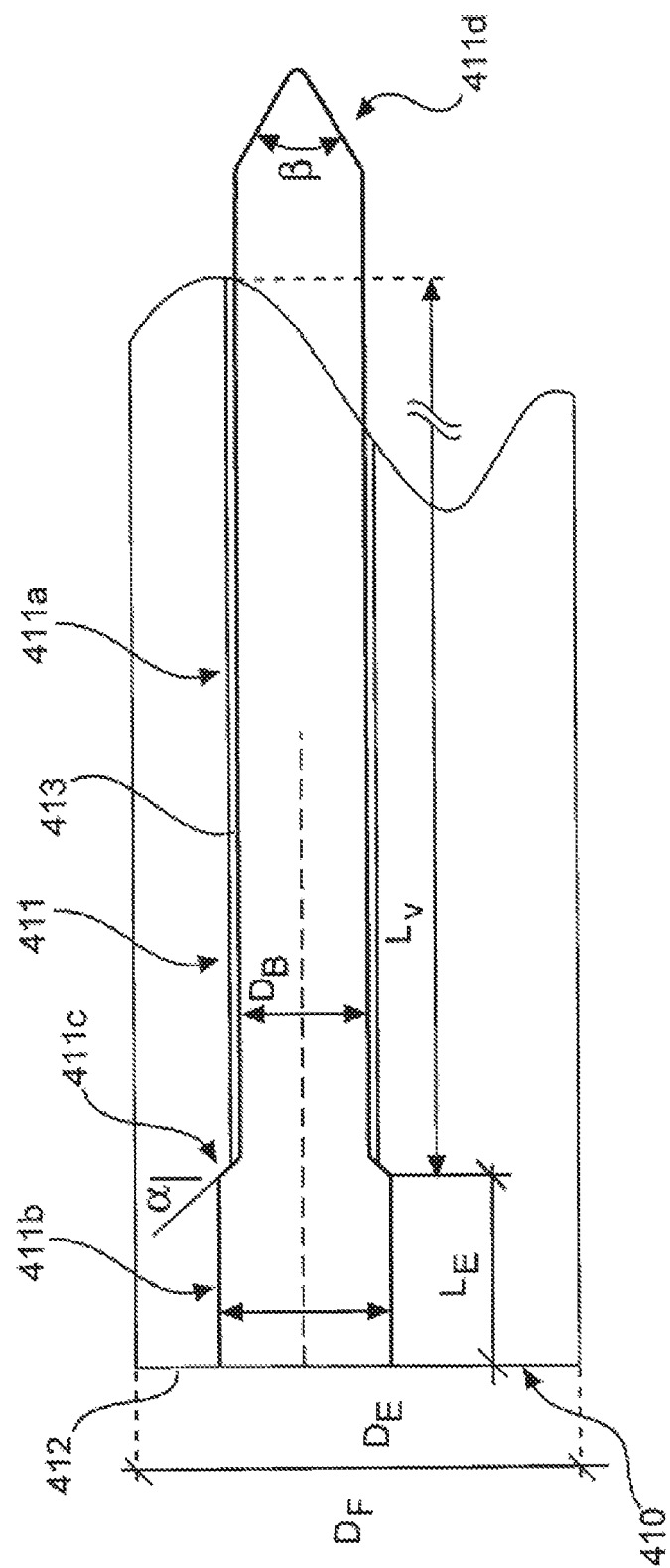
FIG. 4 shows a schematic longitudinal section through a cutout in a connection interface.

FIG. 4 shows a schematic longitudinal section through a cutout 411 in a connection interface 410. The outer circumferential surface of the cutout 411 is formed by the connection material. The cutout 411 is configured in the form of a blind hole, and the opening lies in the end surface 412 of the connection interface 410. The cutout 411 is of substantially cylindrical configuration and has a substantially cylindrical shaft part 411a with a first diameter $D_B$ and has a widened head part 411b, which adjoins the opening, with a second diameter $D_E$, the second diameter $D_E$ being larger than the first diameter $D_B$. A transition portion 411c is configured between the widened head part 411b and the shaft part 411a, said portion preferably having an angle of inclination α of 30 to 60°, in particular of 45°. An end portion 411d is configured at the closed end of the blind hole, said portion preferably having an angle of inclination β of 60 to 120°. The shaft part 411a has an internal thread 413 which is cut directly into the connection material.

In the longitudinal direction of the cutout, the shaft part 411a with a length $L_V$ is many times longer than the head part 411b with a length $L_E$. The longitudinal extent of the cutout 411 along the longitudinal axis corresponds to a multiple of the diameter $D_B$ of the cutout 311. The diameter $D_B$ of the cutout 311 preferably corresponds to approximately a third, preferably about 10 to 50%, in particular about 20 to 40%, of the extent $D_F$ of the connection interface 410 orthogonal to a longitudinal axis of the cutout 411 and/or of the rotor blade.

The connection interfaces 210, 310, 410 preferably comprise a connection material which is identical to a rotor blade material. Further preferably, the connection interfaces 210, 310, 410 are each manufactured integrally with the rotor blade and/or are each configured in one piece with the rotor blade.

The diameter $D_E$ is preferably approximately 1.25 times the diameter $D_B$. Further preferably, the length $D_E$ is preferably approximately 1.5 times the diameter $D_B$. Preferably, the length $L_V$ is approximately 6 times the diameter $D_B$.

Figure 5:
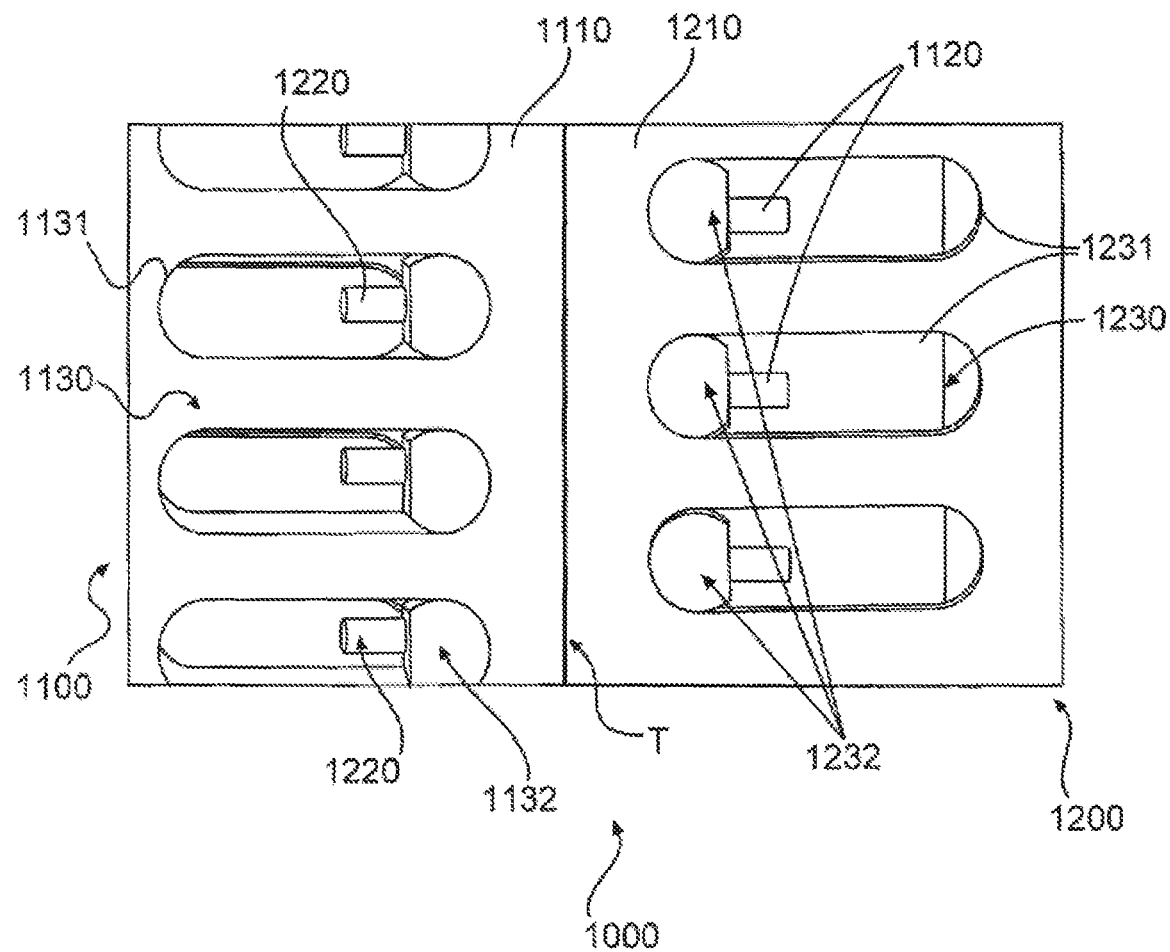
FIG. 5 shows an enlarged detail from an example of an assembled rotor blade.

FIG. 5 shows an enlarged detail from an example of an assembled rotor blade 1000 having a first rotor blade segment 1100 and a second rotor blade segment 1200. Both rotor blade segments 1100, 1200 are configured as described herein.

The first rotor blade segment 1100 comprises a connection interface 1110 with a plurality of tension element anchors 1130 which comprise openings 1131. Anchoring elements 1132 which are configured in the form of D-bolts are arranged in the openings 1131 of the tension element anchors 1130. Cutouts for receiving tension elements are arranged in each case between the tension element anchors 1130. Said cutouts are not visible in FIG. 5, since it is not a sectional illustration. However, the cutouts are configured as described herein, and the outer circumferential surface of the cutouts is formed by the connection material of the connection interface 1110.

The second rotor blade segment 1200 is constructed in a corresponding manner. The second rotor blade segment 1200 comprises a connection interface 1210 with a plurality of tension element anchors 1230 which comprise openings 1231. Anchoring elements 1232 which are configured in the form of D-bolts are arranged in the openings 1231 of the tension element anchors 1230. Cutouts for receiving tension elements are arranged in each case between the tension element anchors 1230. Said cutouts are not visible in FIG. 5, since it is not a sectional illustration. However, the cutouts are configured as described herein, and the outer circumferential surface of the cutouts is formed by the connection material of the connection interface 1200.

The two end surfaces of the connection interfaces 1110, 1210 meet each other at the joint T.

In the cutouts of the first rotor blade segment 1100, tension elements 1120 are introduced, which are anchored in the tension element anchors 1230 of the second rotor blade segment 1200. In the cutouts of the second rotor blade segment 1200, tension elements 1220 are introduced, which are anchored in the tension element anchors 1130 of the first rotor blade segment 1100. The introduction and anchoring of tension elements of the first and second rotor blade segments 1100, 1200 is thus effected alternately here, with other arrangements also being possible, however.

Said connection of rotor blade segments of an assembled rotor blade saves a lot of weight and space, and makes it possible, for example, to arrange a multiplicity of tension elements in a confined space. Corresponding connections are possible not only between rotor blade segments but also, in principle, between a rotor blade and a further element of a wind turbine, such as, for example, a rotor blade hub and/or a rotor blade adapter.

The invention claimed is:

1. An assembled rotor blade, comprising:
   a first rotor blade segment made of a rotor blade material; and
   a second rotor blade segment made of the rotor blade material,
   the first rotor blade segment comprising a connection interface having a cutout for receiving a tension element for connecting the first rotor blade segment to the second rotor blade segment, the cutout being formed in the rotor blade material and having an internal thread;
   the second rotor blade segment comprising a connection interface having a cutout for receiving a tension element for connecting the second rotor blade segment to the first rotor blade segment, the cutout being formed in the rotor blade material and having an internal thread;

a first tension element received in the cutout of the first rotor blade segment and anchored in the second rotor blade segment; and a second tension element received in the cutout of the second rotor blade segment and anchored in the first rotor blade segment.

2. The assembled rotor blade as claimed in claim 1, wherein at least one of the cutouts of the first and second rotor blade segments is a blind hole.

3. The assembled rotor blade as claimed in claim 1, wherein at least one of the cutouts of the first and second rotor blade segments has a depth that is a multiple of a diameter of the respective cutout.

4. The assembled rotor blade as claimed in claim 3, wherein at least one of the cutouts of the first and second rotor blade segments has a depth that corresponds to at least three times the diameter of the respective cutout.

5. The assembled rotor blade as claimed in claim 1, wherein the rotor blade material is a fiber-reinforced composite material.

6. The assembled rotor blade as claimed in claim 5, wherein the fiber-reinforced composite material is a fiber-plastic composite material or a glass-fiber-reinforced epoxy resin composite material.

7. The assembled rotor blade as claimed in claim 1, wherein the rotor blade material has a stiffness that is lower than a stiffness of a material of the tension element of the first and second rotor blade segments, wherein an elastic modulus or a shear modulus of the rotor blade material and the material of the tension element of the first and second rotor blade segments are used as a measure of the stiffness.

8. The assembled rotor blade as claimed in claim 1, wherein the rotor blade material has a stiffness that is many times lower than a stiffness of a material of the tension element of the first and second rotor blade segments, wherein an elastic modulus or a shear modulus of the rotor blade material and the material of the tension element of the first and second rotor blade segments are used as a measure of the stiffness.

9. The assembled rotor blade as claimed in claim 1, wherein the connection interfaces of the first and second rotor blade segments have a plurality of cutouts.

10. A rotor for a wind turbine, comprising:
a rotor hub and at least one rotor blade fastened to the rotor hub, wherein the at least one rotor blade is the assembled rotor blade as claimed in claim 1.

11. The rotor as claimed in claim 10, wherein the first and second tension elements are adhesively bonded in the respective cutouts.

12. A wind turbine, comprising:
a tower; and
a nacelle arranged on the tower, the nacelle having the rotor as claimed in claim 10.

13. A method for repairing the rotor of the wind turbine as claimed in claim 10, comprising:
releasing a third tension element from a third cutout of a connection of the at least one rotor blade to the rotor hub,
enlarging the third cutout to a larger diameter and forming an internal thread, and
fastening the rotor blade to the rotor hub by screwing a tension element with a larger diameter into the third cutout.

14. A method comprising:
assembling the rotor blade as claimed in claim 1, the assembling comprising:
forming the first rotor blade segment with the connection interface,
forming the cutout in the connection interface of the first rotor blade segment by drilling and forming the internal thread,
forming the second rotor blade segment with the connection interface, and
forming the cutout in the connection interface of the second rotor blade segment by drilling and forming the internal thread.

15. A method, comprising:
connecting the assembled rotor blade as claimed in claim 1 to a rotor hub.

* * * * *